United States Patent
Koskinen et al.

(10) Patent No.: US 7,787,859 B2
(45) Date of Patent: Aug. 31, 2010

(54) PREPAID CHARGING IN COMMUNICATION NETWORK

(75) Inventors: Juha-Pekka Koskinen, Hämeenlinna (FI); Julia R. Vallinen, Nokia (FI)

(73) Assignee: Nokia Corporation, Espoo (FI)

( * ) Notice: Subject to any disclaimer, the term of this patent is extended or adjusted under 35 U.S.C. 154(b) by 305 days.

(21) Appl. No.: 10/500,712

(22) PCT Filed: Jan. 9, 2002

(86) PCT No.: PCT/IB02/00795

§ 371 (c)(1),
(2), (4) Date: Aug. 16, 2004

(87) PCT Pub. No.: WO03/058997

PCT Pub. Date: Jul. 17, 2003

(65) Prior Publication Data

US 2005/0136888 A1 Jun. 23, 2005

(51) Int. Cl.
*H04M 11/00* (2006.01)

(52) U.S. Cl. .............. 455/406; 455/405; 455/407; 455/408; 379/114.19; 379/114.2; 379/114.15; 379/114.17

(58) Field of Classification Search ......... 455/405–408; 379/114.2, 114.19, 114.29, 114.06, 114.07, 379/114.15, 114.17, 114.14
See application file for complete search history.

(56) References Cited

U.S. PATENT DOCUMENTS

| | | | | |
|---|---|---|---|---|
| 5,504,808 | A | * | 4/1996 | Hamrick, Jr. ............. 379/114.2 |
| 5,826,185 | A | * | 10/1998 | Wise et al. .................. 455/405 |
| 6,453,029 | B1 | * | 9/2002 | Campbell ................ 379/114.2 |
| 6,496,690 | B1 | * | 12/2002 | Cobo et al. ................. 455/408 |
| 6,941,285 | B2 | * | 9/2005 | Sarcanin ....................... 705/67 |
| 6,947,724 | B2 | * | 9/2005 | Chaney ...................... 455/408 |
| 2002/0025795 | A1 | * | 2/2002 | Sharon et al. .............. 455/405 |
| 2003/0027549 | A1 | * | 2/2003 | Kiel et al. ................... 455/405 |
| 2005/0136890 | A1 | * | 6/2005 | Lippelt ....................... 455/406 |

FOREIGN PATENT DOCUMENTS

| | | | |
|---|---|---|---|
| WO | WO 00/24161 | | 4/2000 |
| WO | WO 00/69118 | | 11/2000 |
| WO | WO 02/01847 A1 | | 1/2002 |
| WO | WO 02/15554 | * | 2/2002 |
| WO | WO 02/15554 A1 | | 2/2002 |

\* cited by examiner

*Primary Examiner*—Tuan H Nguyen
(74) *Attorney, Agent, or Firm*—Alston & Bird LLP

(57) ABSTRACT

A method and apparatus for charging against prepaid credit in a communication network. When a first terminal requests establishment of a call to a second terminal, the network ascertains whether prepaid credit is involved. If so, accounting sessions are established between an accounting server and any accounting servers that will raise costs during the call. A session identifier is generated. Once the call is established, charging update data is sent from the accounting clients to the accounting server, where it is collated on the basis of the accounting session identifier, whereby enabling updating of the prepaid credit during the call.

35 Claims, 2 Drawing Sheets

PREPAID CHARGING IN COMMUNICATION NETWORK

FIELD OF INVENTION

This invention relates to charging in communication networks, especially third generation (UMTS) networks.

The invention has been developed for use as an extension to the Diameter protocol defined by the Internet Engineering Task Force (IETF), and will be described hereinafter with reference to this application. However, it will be appreciated that the invention can be applied to other similar protocols.

BACKGROUND OF INVENTION

Internet Protocol (IP) data transmission is used extensively in third generation (3G) networks. However, IP-related charging protocols and systems are not necessarily capable of providing all the functionality that would be desirable in a mobile telecommunications scenario. Of particular concern is the wide acceptance and use of pre-paid accounts in relation to mobile telephones. Such prepaid accounts are not dealt with in existing IP-related charging systems, largely because IP-communications are, for the most part, not based on pre-paid accounting systems. The problem is exacerbated by the unique nature of the signalling and call set-up routines employed in 3G networks, which have no direct correspondence with, for example, internet access via land-based computers.

A protocol known as Diameter has been proposed for use in IP networks. Diameter provides a base protocol that can be extended in order to provide AAA (Authentication, Authorization and Accounting) services. The base protocol is not intended to be used by itself, and must be used with a Diameter application. Diameter accounting is part of the base protocol and is therefore not intended for use without a Diameter application.

Diameter can provide two types of service to applications. The first involves authentication and authorization, with optional accounting functionality. The second involves just accounting.

Diameter accounting is based on a server directed model with capabilities for real-time delivery of accounting information. This means that an instance that generates charging data gets information from either the authorization sever (if contacted) or the accounting server regarding the way accounting data is to be forwarded.

The Diameter accounting protocol provides real-time accounting, meaning the processing of information on resource usage within a defined time window. Time constraints are typically imposed to limit financial risk.

Diameter does not presently provide for on-line charging. However, next generation cellular network specify a number of requirements and desirable features for on-line charging. Accounting servers in such networks must be able, for example, to check a subscriber's account for coverage of the requested service prior to execution of that service. The subscriber's account must be debited each time the subscriber uses the services related to that account. Subscriber must also be prevented from accessing chargeable events or services related to their specific accounts once the account credit is exhausted or expired.

It is also desirable to allow a mechanism for indicating to the subscriber the charges to be levied for a chargeable event. Also desirable is the ability to handle multiple charging scenarios, in which different combinations of network entities are simultaneously (or at least during a single call or data generating charges in relation to the subscriber's account.

It is an object of the invention to provide a method of charging to a prepaid account within a network.

SUMMARY OF INVENTION

In a first aspect, the present invention provides a method of charging against prepaid credit in communication network, the method comprising the steps of:
  requesting establishment of a call between a first terminal and a second terminal;
  ascertaining whether any costs generated by accounting clients in the network, and associated with the call, are to be charged against prepaid credit;
  in the event some or all of the costs are to be charged against prepaid credit, establishing an accounting session between an accounting server and the accounting client that will generate the costs to be charged against the prepaid credit, the accounting session being allocated an accounting session identifier;
  establishing the call with the second terminal;
  sending charging update data from the accounting client to the accounting server during the call; and
  collating the charging update data in the accounting server on the basis of the accounting session identifier, thereby enabling updating of the prepaid credit during the call.

Preferably, there are a plurality of accounting clients that generate costs in relation to the call. In that case, accounting sessions are established between each respective accounting client and the accounting server, each of the accounting sessions being allocated a common accounting session identifier associated with the call to be established. Charging update data, including the accounting session identifier, are sent from each of the accounting clients to the accounting server during the call. The charging update information is collated in the accounting server on the basis of the accounting session identifier, thereby enabling updating of the prepaid credit during the call.

In a second aspect, the present invention provides communication network apparatus configured to allow charging against prepaid credit in relation to a first terminal, the network including an accounting server and an accounting client capable of generating costs associated with a service in the network, the network being configured to:
  accept a request from the first terminal for establishment of a call between the first terminal and a second terminal;
  ascertain whether any costs generated by accounting clients in the network, and associated with the call, are to be charged against prepaid credit;
  in the event some or all of the costs are to be charged against prepaid credit, establish an accounting session between the accounting server and the accounting client that will generate the costs to be charged against the prepaid credit, the accounting session being allocated an accounting session identifier; and
  establish the call with the second terminal;
  wherein the accounting client is configured to send charging update data to the accounting server during the call; and
  the accounting server is configured to collate the charging update data on the basis of the accounting session identifier, thereby enabling updating of the prepaid credit during the call.

As with the first aspect, it is preferred that multiple accounting clients exist within the network, and are configured to establish accounting sessions with the accounting server for relaying charging update data during the call.

In both aspects, each accounting client preferably takes the form of one of the following network entities:
SGSN/GGSN;
S-CSCF/P-CSCF; and
a network application server.

Typically, the accounting session identifier will be allocated upon receipt in the network of the request for establishment of a call from the first terminal.

Preferably, the request for establishment of a call is made via a Session Initiation Protocol (SIP) message sent from the first terminal.

It is particularly preferred that the charging update data is sent from the accounting clients to the accounting server via a Diameter protocol message. More preferably, the charging update data is sent from each accounting client to the accounting client in response to a Diameter protocol update request issued by the accounting server.

In the preferred embodiment, the accounting server issues the update requests to each accounting client periodically.

BRIEF DESCRIPTION OF DRAWINGS

A preferred embodiment of the invention will now be described, by way of example only, with reference to the accompanying drawings, in which.

DETAILED DESCRIPTION OF PREFERRED AND OTHER EMBODIMENTS

Figure 1:
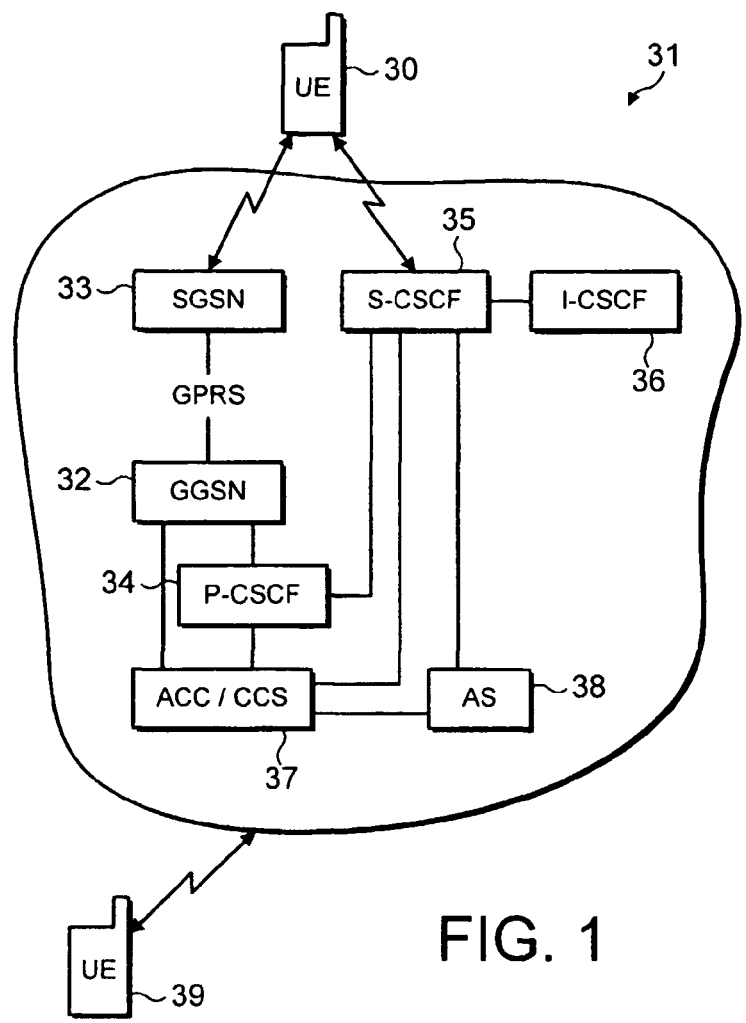
FIG. 1 is a functional block diagram of a third generation communication system.

Referring to the drawings, the preferred embodiment of the invention is implemented by way of a single third generation communication network 31, having a core network section and other peripheral network units. Only the units that are pertinent to the present description are shown in FIG. 1. In particular, the description that follows refers mainly to messaging and data flow that relates to establishment and implementation of accounting data for the purpose of charging a prepaid account. It will be understood that other messages and data are transmitted within the network to enable establishment of the call or data link, but these are well known in the art and have been omitted for clarity. It will also be appreciated that the word call is used in a broad sense within this specification and claims to include any type of channel or link that a user wishes to open, including video, image and sound channels, whether two-way or, uplink or downlink only.

The network core includes a GGSN (Gateway GPRS Support Node) 32, an SGSN (Serving GPRS Support Node) 33, a P-CSCF (Proxy Call Service Control Function) 34, an S-CSCF (Serving Call Service Control Function) 35, an I-CSCF (Interrogating Call Service Control Function) 36 an Accounting Server/Credit Control Server (ACC/CCS) 37 and an Application Server (AS) 38. It will be appreciated that the ACC/CCS is specified in drafts of the Diameter IP protocol. However, the ACC/CCS can also be considered a Charging Control Point (CCP) incorporating a Charging Control Function (CCF). In other words, they act as a prepaid server.

A first terminal in the form of a caller UE 30 is within the network service area and is attempting to establish a call to a second terminal in the form of a receiving UE 39. The user of the first terminal has previously established a prepaid credit account with the network service provider. The intention of prepaid credit account is to ensure that a user cannot incur costs that have not been prepaid. In this way, users are not surprised by large bills that can come about in post-paid situations, and the service providers can offer service without the need for investigating the credit-worthiness of a user.

For clarity, the actual details of the call establishment with caller UE 30 will be omitted, other than as they relate to the accounting procedures that relate to the invention. Similarly, the general functions of most of the units in FIG. 1 are well known and will not be described in detail here.

The network of FIG. 1 is an all-IP (internet protocol) network. In the illustrated case, it is assumed that the network is the caller UE 30 subscriber's home network and that the receiver UE 39 is also located within the same network, for the purposes of simplicity. However, it will be readily be understood by those skilled in the art how the preferred embodiment can be extended to cover situations in which either or both of the UEs 30 and 39 are not within the home network of the UE 30 (ie, one or both of the UEs are "roaming"). Such a scenario is described in the context of post-pay accounting in the applicant's UK patent application number 0112202.7.

It will also be understood that the particular components shown within FIG. 1 can be distributed across a number of networks. Again, the way in which this can be achieved will be well understood by those skilled in the art, and so is not described in detail here.

In general terms, the S-CSCF of a subscriber's home network acts to collect notices of charges levied for the activities of a subscriber to that network, or as a gateway to a unit that does so. The CSCFs of the system of FIG. 1 operate so as to facilitate charging in the system, as will now be described in detail.

Figure 3:
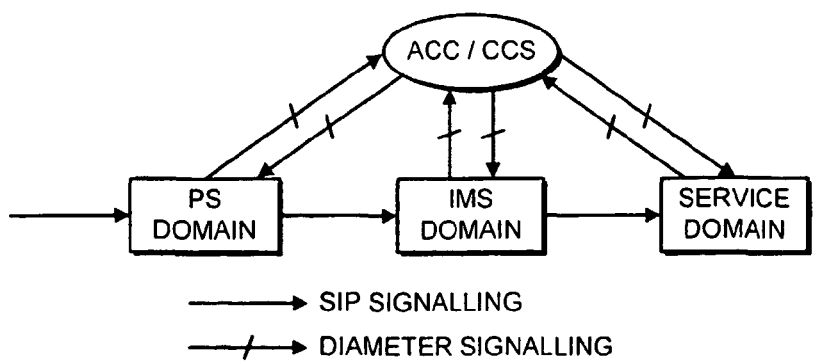
FIG. 3 shows the flow of SIP and Diameter protocol data within the network, in accordance with the invention.
Figure 2:
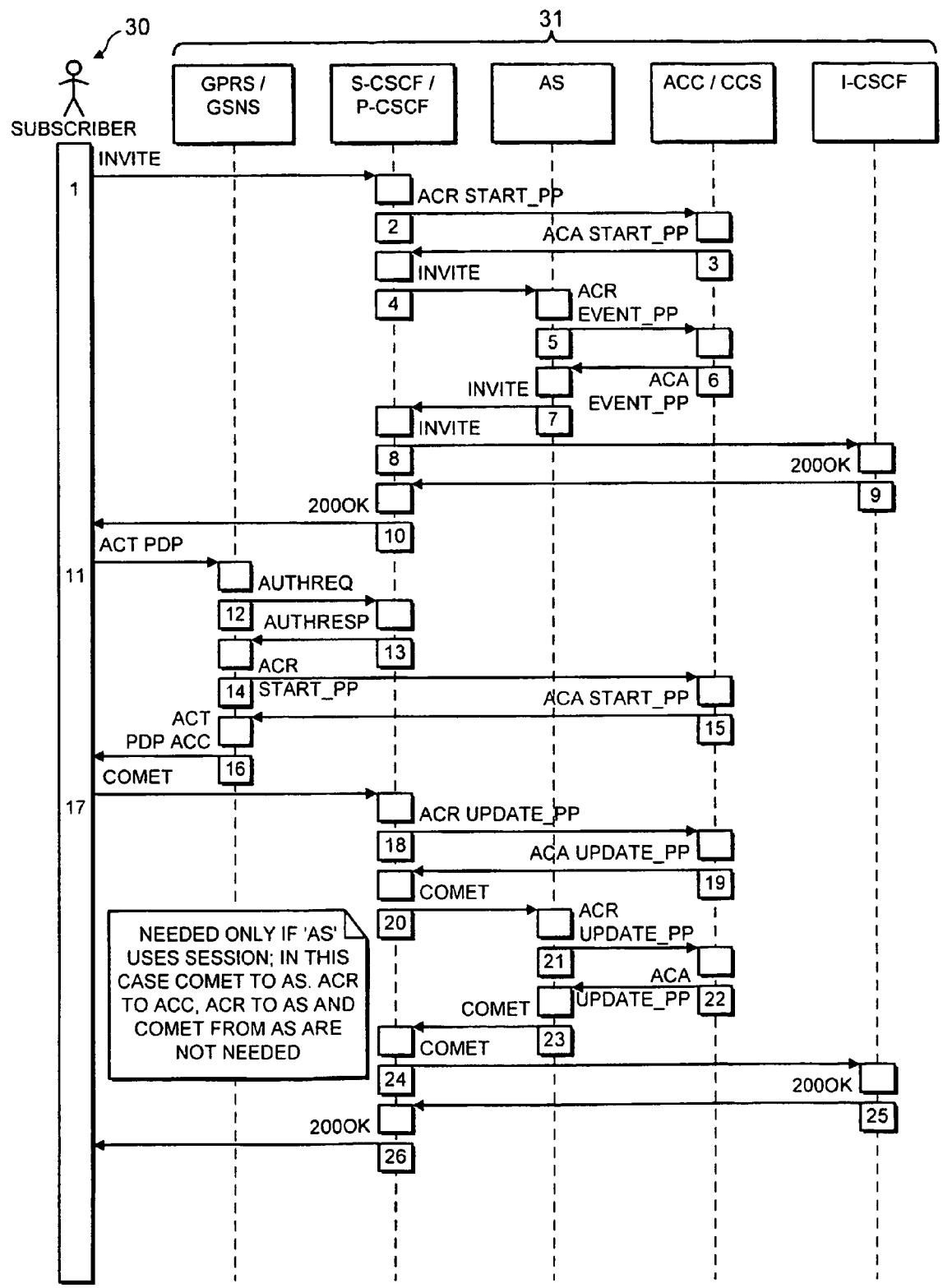
FIG. 2 illustrates data flow between entities of the system of FIG. 1.

By way of a simple overview of the invention, FIG. 3 shows the way in which SIP data flow horizontally between network entities within the different domains, whilst accounting data flows vertically and uses the Diameter protocol.

When the user of UE 30 wishes to establish a call to UE 39, the following steps take place.

1. The user of UE 30 initiates the call, causing terminal 30 to transmit an INVITE message to the S-CSCF 35, requesting for the initiation of a call with UE 39. The signalling to establish the call itself is performed in the normal way. The S-CSCF 35 inserts the following information into the INVITE message:
    GS_ID
    CG_ADDRESS
    ACC_S_ADDRESS.

The GS_ID is a global session ID, which is used to allow combining of different accounting sessions. CG_ADDRESS is the address of the default Charging Gateway. ACC_S_ADDRESS is the address of the default ACC/CCS server, which acts as a prepaid server.

2. The S-CSCF 35 sends the following accounting request (Diameter) to the ACC/CCS 37:
    Accounting-Request:
    <Session-Id>=1
    [Accounting-Record-Type]=START_PP
    [Accounting-Multi-Session-Id]=GS_ID
    [Subscription-Id]=exists
    [Time-Stamp]=exists 3. The ACC/CCS 37 sends the following Accounting-Answer (in Diameter protocol) to the S-CSCF 35. The ACC/CCS 37 will do the tariffing and rating and money reservation from the actual account.
Accounting-Answer:
<Session-Id>=1
[Accounting-Record-Type]=START_PP
[Accounting-Multi-Session-Id]=GS_ID
[Accounting-Interim-Interval]=30s
[Subscription-Id]=exists
4. The S-CSCF 35 sends an INVITE (SIP) to Application Server AS 38, including the following information:
GS_ID
CG_ADDRESS
ACC_S_ADDRESS.
5. The AS 38 sends an Accounting-Request (Diameter) to the ACC/CCS 37, as follows. The AS 38 doesn't know the cost of its service.
Accounting-Request:
<Session-Id>=2
[Accounting-Record-Type]=EVENT_PP
[Accounting-Multi-Session-Id]=GS_ID
[Subscription-Id]=exists
[Time-Stamp]=exists
[Service-Parameter-Info]=exists
6. The ACC/CCS 37 sends an Accounting-Answer (Diameter) to AS 38, as follows:
Accounting-Answer:
<Session-Id>=2
[Accounting-Record-Type]=EVENT_PP
[Accounting-Multi-Session-Id]=GS_ID
7. The AS 38 sends an INVITE (SIP) to S-CSCF 35
8. The S-CSCF 35 sends an INVITE (SIP) message to I-CSCF 36.
9. The I-CSCF 36 sends a 2OOOK message (SIP) to S-CSCF 35.
10. The S-CSCF 35 sends a 2OOOK (SIP) to the subscriber's UE 30.
11. The subscriber's UE 30 sends a secondary PDP context to GGSN 32.
12. The GGSN 32 sends an Auth Request to P-CSCF 34.
13. The P-CSCF 34 sends an Auth Response to GGSN 32, including the following information:
GS_ID
CG_ADDRESS
ACC_S_ADDRESS.
14. The GGSN 32 sends an Accounting-Request (Diameter) to ACC/CCS 37, as follows:
Accounting-Request:
<Session-Id>=3
[Accounting-Record-Type]=START_PP
[Accounting-Multi-Session-Id]=GS_ID
[Subscription-Id]=exists
[Time-Stamp]=exists
15. The ACC/CCS 37 sends an Accounting-Answer (Diameter) to GGSN 32. ACC/CCS 37 will do the tariffing and rating and money reservation from actual account. In this phase the session is about to be established so ACC/CSS 37 has been able to do final rating for GSN nodes (IMS, AS and GPRS combination effects to tariff/rate).
The accounting answer is as follows:
Accounting-Answer:
<Session-Id>=3
[Accounting-Record-Type]=START_PP
[Accounting-Multi-Session-Id]=GS_ID
[Accounting-Interim-Interval]=30s
[Subscription-Id]=exists
16. ACT secondary PDP context accepted from GGSNs to UE 30.
17. COMET (SIP) from UE 30 to S-CSCF 35.
18. Accounting-Request (Diameter) from S-CSCF 35 to ACC/CCS 37, as follows:
Accounting-Request:
<Session-Id>=1
[Accounting-Record-Type]=UPDATE_PP
[Accounting-Multi-Session-Id]=GS_ID
[Subscription-Id]=exists
[Time-Stamp]=exists
19. Accounting-Answer (Diameter) from ACC/CCS 37 to S-CSCF 35.
ACC/CCS 37 will do the tariffing/rating and money reservation from actual account. The accounting answer is as follows:
Accounting-Answer:
<Session-Id>=1
[Accounting-Record-Type]=UPDATE_PP
[Accounting-Multi-Session-Id]=GS_ID
[Accounting-Interim-Interval]=90s
[Subscription-Id]=exists NOTE: Steps 20-23 are only undertaken if AS is not in one-time mode.
20. COMET (SIP) from S-CSCF 35 to AS 38.
21. Accounting-Request (Diameter) from AS 38 to ACC/CCS 37.
22. Accounting-Answer (Diameter) from ACC/CCS 37 to AS 38.
23. COMET (SIP) from AS 38 to S-CSCF 35.
24. COMET (SIP) from S-CSCF 35 to I-CSCF 36.
25. 2OOOK (SIP) from I-CSCF 36 to S-CSCF 35.
26. 2OOOK (SIP) from S-CSCF 35 to UE 30.

The protocol being used in the example is the AAA (Authentication, Authorization and Accounting) extension of the Diameter IP protocol. Currently with the existing Diameter solution there is no difference between post-paid and prepaid accounts. To enable handling of prepaid accounts in accordance with the preferred embodiment, the AAA extension has been modified to include the following record types: START_PP, STOP_PP, EVENT_PP and UPDATE_PP.

The first three record types correlate generally with the START, STOP and EVENT record types already in use in the protocol. However, there is no record type currently proposed or in use that corresponds with the UPDATE record type described above. The purpose of the new UPDATE record type is to allow polling of the various accounting clients by the ACC/CCS.

The UPDATE record type can be used to change the tariff of the already established session. This functionality is needed when different domains interact with each other, such as when actions within the PS affect the IMS domain charges. In current IETF drafts this factor has not been taken into account. The absence of an update function within the present proposed protocol means it is not possible to update ongoing accounting sessions, and so sponsorship-like charging plans or any other more complicated charging plans can not be implemented. In each case, the new _PP extension makes it clear to the entities that are receiving the record types that they are related to prepaid accounts, which must be treated differently to post-paid accounts. This new extension distinguishes post and prepaid mechanisms, thereby decreasing the signalling load. The new extensions distinguish post and prepaid mechanisms, thereby decreasing the amount of logical functionality needed in the server side.

Once the steps listed above have taken place and been acknowledged, traffic data can be transferred between UEs 30 and 39, in this case via the GGSN 32.

A single third generation network may include a number of elements that can generate charging data that are relevant to the invention. These may be members of the IMS (IP multimedia subsystem) of the network, for instance the P-CSCF, S-CSCF, I-CSCF, BGCF (breakout gateway control function) and MGCF (multimedia gateway control function), or members of the PS (packet-switched) domain, for instance the SGSN and GGSN. The charging data generated by the IP and PS domains may include different data. For example, a CDR generated by the GGSN (known as a G-CDR) typically includes information on the amount of packet-switched data transferred during the call, since the tariff for a packet-switched connection may be based on the amount of data transferred; whereas charges generated by the P-CSCF may include information on the time taken for the call, since the tariff for an IP connection may be based on that factor. If a call makes us of both IP and PS connections then it is possible that multiple charging data may be generated for the call, and the result of this may be that a user is charged twice for the same call. To avoid this, the network may be arranged so that the IP and PS domains of the network cooperate so that charging data is not duplicated in this way.

A similar addition to charging information may be used in case of other applications too, suitably for content-based charging purposes.

As an alternative, the GGSN may also indicate to the P-CSCF that it will generate charging data. In that case there would be no need to create such data in the IP multimedia subsystem itself.

Although the invention has been described with reference to a number of specific examples, it will be appreciated by those skilled in the art that the invention can be embodied in many other forms.

The invention claimed is:

1. A method, comprising:
   establishing accounting sessions between each respective accounting client of a plurality of accounting clients and allocating a common accounting session identifier to each of the accounting sessions based on a received request to establish an accounting session between an accounting server and at least one accounting client, wherein the accounting sessions are configured to generate costs to be charged against prepaid credit during a call after ascertaining whether any costs generated by the plurality of accounting clients in a network, which are associated with a request to establish the call between a first terminal and a second terminal, are to be charged against the prepaid credit;
   receiving, at the accounting server, charging update data from each of the plurality of accounting clients during the call, the charging update data including the accounting session identifier and tariff update data; and
   collating charging update data from each of the accounting clients in the accounting server based on the accounting session identifier and the received charging update data at the accounting server, to enable updating of the prepaid credit during the call.

2. A method according to claim 1, wherein the accounting server is located in a home network of the first terminal.

3. A method according to claim 1, wherein each accounting client comprises one of the following network entities:
   service general packet radio service support node/gateway general packet radio service support node;
   serving call service control function/proxy call service control function; or
   a network application server.

4. A method according to claim 1, wherein the accounting session identifier is allocated upon receipt in the network of the request for establishment of a call from the first terminal.

5. A method according to claim 1, wherein the request for establishment of a call is made via a session initiation protocol message sent from the first terminal.

6. A method according to claim 1, wherein the charging update data is sent from the accounting clients to the accounting server via a diameter protocol message.

7. A method according to claim 6, wherein the charging update data is received from each accounting client to the accounting server in response to a diameter protocol update request issued by the accounting server.

8. A method according to claim 7, wherein the accounting server is configured to issue the update requests to each accounting client periodically.

9. A method according to claim 1, further comprising, in response to receiving a request to ascertain whether costs are to be charged against prepaid credit the method, looking up subscriber profile data upon receipt of the request for establishment of the call.

10. A method according to claim 1, wherein the network comprises an interne protocol network.

11. A method according to claim 10, wherein the network comprises a universal mobile telecommunications system network.

12. A method according to claim 1, further comprising, in response to receiving the request to ascertain, causing transmission of a response including an indication that costs generated by accounting clients in a network associated with a request to establish a call between a first and second terminal are to be charged against prepaid credit.

13. An apparatus, comprising:
    a processor configured to cause the apparatus to at least:
    establish accounting sessions between each respective accounting client of a plurality of accounting clients and to allocate a common accounting session identifier to each of the accounting sessions based on a received request to establish an accounting session with at least one accounting client, wherein the accounting sessions are configured to generate costs to be charged against prepaid credit during a call after ascertaining whether any costs generated by the plurality of accounting clients in a network, which are associated with a request to establish the call between a first terminal and a second terminal, are to be charged against the prepaid credit;
    receive charging update data from each of the plurality of accounting clients during the call, the charging update data including the accounting session identifier and tariff update data; and
    collate charging update data from each of the accounting clients based on the accounting session identifier and the received charging update data, to enable updating of the prepaid credit during the call.

14. An apparatus according to claim 13, wherein each accounting client comprises one of the following network entities:
    service general packet radio service support node/gateway general packet radio service support node;
    serving call service control function/proxy call service control function; or
    a network application server.

15. An apparatus according to claim 13, wherein the accounting session identifier is configured to be allocated upon receipt of the request for establishment of a call from the first terminal.

16. An apparatus according to claim 13, wherein the request for establishment of a call is made via a session initiation protocol message.

17. An apparatus according to claim 13, wherein the charging update data is received from the accounting clients via a diameter protocol message.

18. An apparatus according to claim 17, wherein the charging update data is received from each accounting client in response to an issued diameter protocol update request.

19. An apparatus according to claim 18, wherein the processor is configured to cause the apparatus to issue the update requests to each accounting client periodically.

20. An apparatus according to claim 13, wherein the processor is further configured to cause the apparatus to ascertain whether costs are to be charged against prepaid credit by looking up subscriber profile data upon receipt of the request for establishment of the call.

21. An apparatus according to claim 13 wherein the processor is further configured to cause the apparatus to cause transmission of a response including an indication that costs generated by accounting clients in a network associated with a request to establish a call between a first and second terminal are to be charged against prepaid credit in response to the request to ascertain.

22. An apparatus, comprising:
a processor configured to cause the apparatus to at least:
establish an accounting session being allocated an accounting session identifier based on a request to establish an accounting session with an accounting server configured to generate the costs to be charged against prepaid credit associated with a request to establish a call between a first and second terminal, wherein the accounting session identifier comprises a common accounting session identifier allocated to a plurality of accounting sessions established between the accounting server and a plurality of accounting clients, and
cause charging update data to be sent to the accounting server during the call established between the first and second terminals for collation by the accounting server based on the accounting session identifier, to enable updating of the prepaid credit during the call, wherein the charging update data sent during the call includes the accounting session identifier and tariff update data.

23. An apparatus according to claim 22, wherein the accounting server is located in a home network of a first terminal for the call.

24. An apparatus according to claim 22, wherein the accounting session identifier is configured to be allocated upon receipt of the request for establishment of a call.

25. An apparatus according to claim 22, wherein the request for establishment of a call is made via a session initiation protocol message sent from a first terminal.

26. An apparatus according to claim 22, wherein the processor is configured to cause the apparatus to cause the charging update data to be sent via a diameter protocol message.

27. An apparatus according to claim 26, wherein the processor is configured to cause the apparatus to cause the charging update data to be sent in response to a diameter protocol update request issued by the accounting server.

28. An apparatus according to claim 27, wherein the accounting server is configured to issue the update requests periodically.

29. An apparatus according to claim 22, wherein the accounting server is configured to ascertain whether costs are to be charged against prepaid credit by looking up subscriber profile data upon receipt of the request for establishment of the call.

30. An apparatus, comprising:
means for establishing accounting sessions between each respective accounting client of a plurality of accounting clients and for allocating a common accounting session identifier to each of the accounting sessions based on a received request to establish an accounting session with at least one accounting client, wherein the accounting sessions are configured to generate costs to be charged against prepaid credit during a call after ascertaining whether any costs are generated by the plurality of accounting clients in a network, which are associated with a request for establishing the call between a first terminal and a second terminal, are to be charged against the prepaid credit;
means for receiving charging update data from each of the plurality of accounting clients during the call, the charging update data including the accounting session identifier and tariff update data; and
means for collating charging update data from each of the accounting clients based on the accounting session identifier and the received charging update data to enable updating of the prepaid credit during the call.

31. An apparatus, comprising:
means for establishing an accounting session being allocated an accounting session identifier based on a received request to establish an accounting session with an accounting server configured to generate the costs to be charged against prepaid credit associated with a request for establishing a call between a first and second terminal, wherein the accounting session identifier comprises a common accounting session identifier allocated to a plurality of accounting sessions established between the accounting server and a plurality of accounting clients; and
means for causing charging update data to be sent to the accounting server during the call established between the first and second terminals for collation by the accounting server based on the accounting session identifier, thereby enabling updating of the prepaid credit during the call, wherein the charging update data sent during the call includes the accounting session identifier and tariff update data.

32. A method, comprising:
establishing an accounting session being allocated an accounting session identifier based on receiving a request to establish an accounting session with an accounting server configured to generate the costs to be charged against prepaid credit associated with a request to establish a call between a first and second terminal, wherein the accounting session identifier comprises a common accounting session identifier allocated to a plurality of accounting sessions established between the accounting server and a plurality of accounting clients; and
causing charging update data to be sent to the accounting server during the call established between the first and second terminals for collation by the accounting server based on the accounting session identifier, to enable updating of the prepaid credit during the call, wherein the charging update data sent during the call includes the accounting session identifier and tariff update data.

33. A method according to claim 32, wherein the accounting session identifier is configured to be allocated upon receipt of the request for establishment of a call.

34. A method according to claim 32, wherein update requests are received from the accounting server periodically.

35. A method according to claim 32, wherein the charging update data is sent to the accounting server via a diameter protocol message.

* * * * *

UNITED STATES PATENT AND TRADEMARK OFFICE
CERTIFICATE OF CORRECTION

| | | |
|---|---|---|
| PATENT NO. | : 7,787,859 B2 | Page 1 of 1 |
| APPLICATION NO. | : 10/500712 | |
| DATED | : August 31, 2010 | |
| INVENTOR(S) | : Koskinen et al. | |

It is certified that error appears in the above-identified patent and that said Letters Patent is hereby corrected as shown below:

Title page,
Item (75), Inventors: "Julia R. Vallinen" should read --Juha R. Vallinen--.

Signed and Sealed this
Tenth Day of January, 2012

David J. Kappos
*Director of the United States Patent and Trademark Office*